United States Patent [19]
Yasuda

[11] Patent Number: 5,617,725
[45] Date of Patent: Apr. 8, 1997

[54] PISTON FOR A MASTER CYLINDER

[75] Inventor: Atsushi Yasuda, Aichi, Japan

[73] Assignee: Aisin Seiki Kabushiki Kaisha, Kariya, Japan

[21] Appl. No.: 548,864

[22] Filed: Oct. 26, 1995

[30] Foreign Application Priority Data

Oct. 27, 1994 [JP] Japan .................... 6-264261

[51] Int. Cl.$^6$ ............................ B60T 11/02; B01D 19/00
[52] U.S. Cl. .................... 60/562; 92/248; 92/255
[58] Field of Search ................ 60/533, 562; 92/248, 92/255

[56] References Cited

U.S. PATENT DOCUMENTS

| | | | |
|---|---|---|---|
| 4,203,354 | 5/1980 | Cunningham | 92/248 X |
| 4,510,752 | 4/1985 | Gaiser | 92/248 X |
| 4,876,853 | 10/1989 | Shirai et al. | 60/562 X |
| 4,987,739 | 1/1991 | Coleman | 60/562 |
| 4,998,461 | 3/1991 | Ishiwata et al. | 92/248 |

FOREIGN PATENT DOCUMENTS

| | | |
|---|---|---|
| 63-180459 | 11/1988 | Japan . |
| 4-43558 | 4/1992 | Japan . |
| 4-92475 | 8/1992 | Japan . |

*Primary Examiner*—Hoang Nguyen
*Attorney, Agent, or Firm*—Burns, Doane, Swecker & Mathis, LLP

[57] ABSTRACT

A piston for a master cylinder comprises: a piston body made of resin which is inserted in a cylinder in such a manner that the piston body is in slide contact with the inner cylindrical surface of the cylinder, the piston body including a first cylindrical portion which has a first opening at one end and a bottom at the other end, a second cylindrical portion which has a second opening at one end and a bottom at the other end which is integral with the bottom of the first cylindrical portion, thus being integral with the first cylindrical portion; flanges formed on both end portions of the piston body; a first reinforcing member which is detachably inserted into the first opening; and a second reinforcing member which is detachably inserted into the second opening.

11 Claims, 2 Drawing Sheets

PISTON FOR A MASTER CYLINDER

BACKGROUND OF THE INVENTION

1. Field of the Invention

This invention relates to pistons for use in master cylinders which are used, for instance, for brakes, and more particularly to a piston of this type which is made of resin.

2. Description of the Prior Art

The piston for a master cylinder which is made of aluminum or iron is well known in the art, and it is generally high in manufacturing cost, being formed by machining, hardening and so forth. In order to overcome this difficulty, a piston made of resin has been proposed in the art. However, the piston made of resin cannot satisfy the requirement that the piston for a master cylinder should be sufficiently high in compressive strength. In the case where the piston is made of resin, voids (bubbles) may be formed inside it, because the inner and outer surfaces of the piston made of resin are different in the speed of coagulation from each other depending on the wall thickness of the latter. That is, the piston made of resin may be low in compressive strength. In order to eliminate this difficulty, a master cylinder with a piston made of resin has been proposed by Japanese Utility Model Unexamined Publication No. Hei 4-43558. FIG. 3 is a sectional view of the conventional piston made of resin thus proposed. The master cylinder comprises: a master cylinder body; a piston made of resin (hereinafter referred to as "a resin piston") which is slidably supported in the master cylinder body; and a metal member an axis of which is in alignment with the axis of the resin piston, the metal member being inserted into the resin piston to reinforce the latter. In the master cylinder, the metal member includes: an exposing portion which is exposed at only one end of the resin piston as viewed in the direction of axis of the latter; and a burying portion with a groove which is buried in the resin piston. The resin piston and the metal member are provided as one unit by insert injection molding.

The above-described piston for the master cylinder disclosed by the aforementioned Japanese Utility Model Publication No. Hei 4-43558 suffers from the following difficulties: In order to make the resin piston high in compressive strength, the piston is formed by insert injection molding with the metal member set inside it. In the resin piston, its portion around the metal member is larger in the thickness of resin than the remaining portions; that is, the piston is not uniform in the thickness of resin. The relatively thicker portion of the piston, and the relatively thinner portion of the latter are different from each other in the speed of coagulation, and voids are liable to be formed in the relatively thicker portion of the piston. This fact makes it difficult to make the relatively thicker portion of the piston high in compressive strength.

In the insert injection molding operation, for instance the setting of the metal member takes time. Hence, the insert injection molding method is not suitable for the formation of the resin piston, being low in work efficiency.

Furthermore, the conventional piston has an undercut to fix a seal ring. Hence, in manufacturing the piston, a parting line is formed on its portion which is brought into contact with the inner cylindrical surface of the cylinder. Therefore, the manufacture of the piston must have a step of removing the parting line. This is one of the factors which increases the number of manufacturing steps, and accordingly the manufacturing cost.

SUMMARY OF THE INVENTION

In view of the foregoing, an object of the invention is to provide a resin piston for a master cylinder which is sufficiently high in compressive strength with respect to the load applied both ends of the piston, and which can be formed with high work efficiency.

The foregoing object of the invention has been achieved by the provision of a piston in a master cylinder which, according to one aspect of the invention, comprises:

a piston body made of resin which is inserted in a cylinder in such a manner that the piston body is in slide contact with an inner cylindrical surface of the cylinder, the piston body including a first cylindrical portion which has a first opening at one end and a bottom at the other end, and a second cylindrical portion which has a second opening at one end and a bottom at the other end which is integral with the bottom of the first cylindrical portion, thus being integral with the first cylindrical portion;

flanges formed on both end portions of the piston body in such a manner that the flanges are in contact with the inner cylindrical surface of the cylinder;

a first reinforcing member which is detachably inserted into the first opening; and a second reinforcing member which is detachably inserted into the second opening.

In the piston, according to another aspect of the invention, the inner diameter of the bottom of the piston body at the side of the first cylindrical portion, which is in contact with the first reinforcing member, is larger than the inner diameter of the bottom of the piston body at the side of the second cylindrical portion.

Furthermore, in the piston, according to still another aspect of the invention, each of the first and second reinforcing member defines a space in the cylinder which prevents each of the first and second reinforcing members from containing the inner cylindrical surface of the cylinder.

In the piston of the invention, the materials of the first and second reinforcing members are not particularly specified; that is, they may be made of either metal or resin. However, any one of the first and second reinforcing members which is abutted against the push rod should be made of metal because it must be sufficiently high in mechanical strength.

In the piston according to the third aspect of the invention, the space is such that, even in the case where the first and second reinforcing members are not coaxial with the piston body to some extent, the first and second reinforcing members are prevented from contacting the inner cylindrical surface of the cylinder.

In the piston according to the first aspect of the invention, the employment of the first and second reinforcing members not only makes it unnecessary to increase the wall thickness of the piston body but also contributes to make the wall thickness uniform. Hence, during molding of the piston body, voids are scarcely formed therein. In addition, at least one of the first and second reinforcing members is detachably inserted into the piston body. Hence, the technical concept of the invention can be applied to different master cylinders in different vehicles. That is, master cylinders which are different in total length depending on the vehicles can be formed by changing the first or second reinforcing member with the piston body employed as it is.

In the piston according to the second aspect of the invention, the inner diameter of the bottom of the piston body at the side of the first cylindrical portion, which is in contact of the first reinforcing member, is larger than that of the bottom of the piston body at the side of the second cylindrical portion. This eliminates the difficulty that the load is applied only to the bottom of the piston body; that is, it is collectively applied to the bottom of the piston body.

In the piston according to the third aspect of the invention, the first and second reinforcing members define the spaces in the cylinder so that, even if those members are not coaxial with the piston body to some extent, they are prevented from contacting the inner cylindrical surface of the cylinder.

The above and other objects and features of the present invention will be more apparent from the following description taken in conjunction with the accompanying drawings.

DETAILED DESCRIPTION OF THE PREFERRED EMBODIMENTS

One preferred embodiment of the invention will be described with reference to the accompanying drawings.

Figure 1:
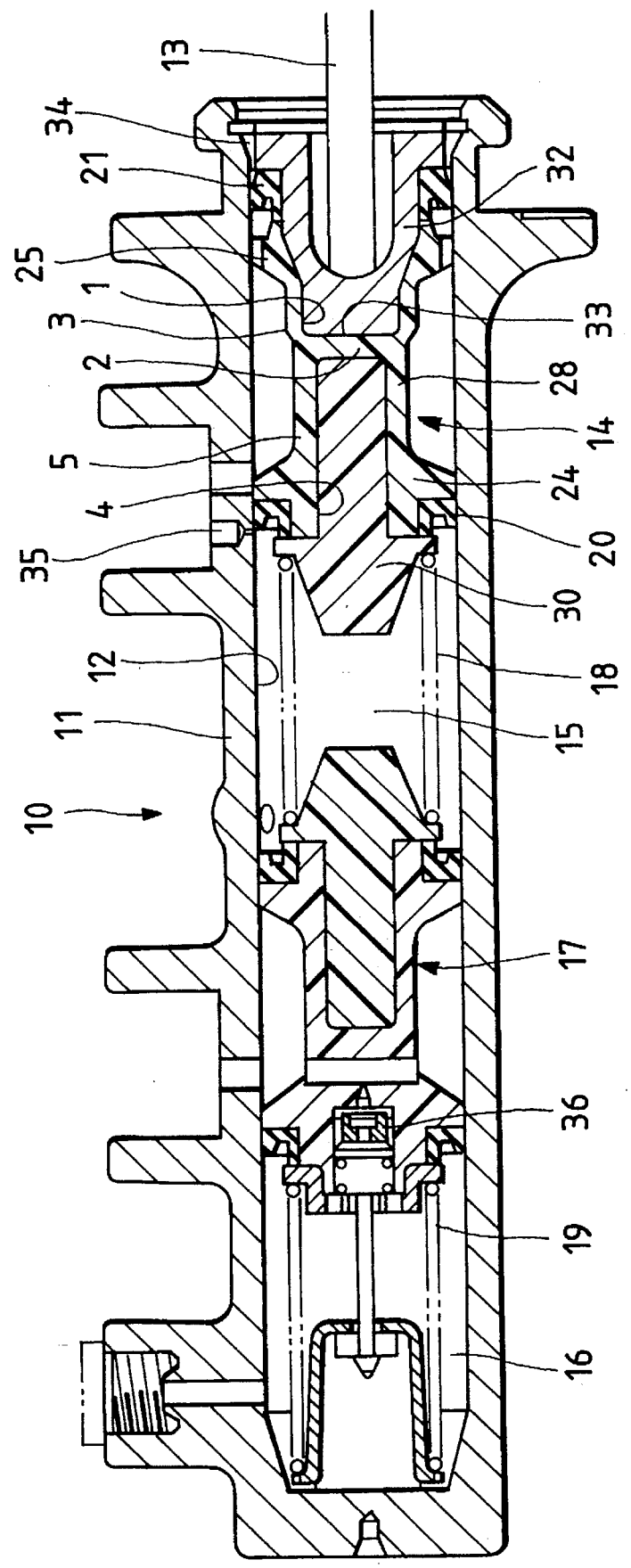
FIG. 1 is a sectional view showing a master cylinder according to an embodiment of the invention.

FIG. 1 is a sectional view of a brake master cylinder which employs a piston according to the invention.

First, the arrangement of the master cylinder will be described. In FIG. 1, a master cylinder 10 includes a bottomed cylinder 11; a first piston 14 which is provided in the cylinder 11 in such a manner that it is slidable on an inner cylindrical surface 12 of the cylinder 11, the first piston 14 being coupled to an input member, namely, a push rod 13; a second piston 17 which is also provided in the cylinder 11 in such a manner that it is slidable on the inner cylindrical surface 12 of the cylinder 11, and that the second piston 17 and the first piston 14 form a first pressure chamber 15, and the second piston 17 and the bottom of the cylinder 11 form a second pressure chamber 16; a first spring 18 which urges the first piston 14 to the right in FIG. 1 (so as to release the pressing force of the push rod 13); and a second spring 19 which urges the second piston 17 to the right in FIG. 1 (so as to release the pressing force of the push rod 13). The elastic force of the second spring 19 is greater than the elastic force of the first spring 18.

Now, the first and second pistons 14 and 17, main components of the master cylinder, will be described.

The first piston 14 is made up of a piston body 28 made of resin, a first reinforcing member 32 made of metal, and a second reinforcing member 30 made of resin. The piston body 28 includes: a first cylindrical portion 3 which has a first opening 1 at one end thereof and a bottom 2 at the other end; a second cylindrical portion 5 which has a second opening 4 at one end thereof and a bottom at the other end which is integral with the bottom of the first cylindrical portion 3, thus being integral with the first cylindrical portion 2. The thickness of the bottom 2 is smaller than the diameters of the first and second openings 1 and 4. The first reinforcing member 32 is inserted into the first opening 1, and the second reinforcing member 30 is inserted into the second opening 4. The piston body 28 has flanges 24 and 25 on the outer cylindrical surfaces of its both end portions which support cup-shaped seal rings 20 and 21, respectively, to thereby maintain the first chamber 15 liquid-tight. The piston body 28 and the second reinforcing member 30 are made of a thermoplastic resin (such as "Nylon 66") containing reinforcing fibers (such glass fibers and carbon fibers). In the piston 14, the first reinforcing member 32 is abutted against the push rod 13, and therefore it must be considerably high in mechanical strength. This is the reason why the first reinforcing member 32 is made of metal material such as iron or aluminum alloy.

The surface of the first reinforcing member 32 through which the latter 32 is abutted against the piston body 28 is made flat as indicated at 33, so that the load applied to the first reinforcing member 31 by the push rod 13 is dispersed as much as possible. A space 34 is defined between the inner cylindrical surface 12 of the cylinder and the first reinforcing member 32. The space 34 is to eliminate the difficulty that, in the case where the first reinforcing member 32 is not coaxial with the piston body, it may contact the inner cylindrical surface of the cylinder 11, thus providing a slide resistance. The inner diameter of the bottom of the piston body 28 at the side of the first cylindrical portion 2, which is in contact of the first reinforcing member 32, is larger than that of the bottom of the piston body 28 at the side of the second cylindrical portion 5.

The second piston 17 is substantially equal in structure to the first piston 14; however, it should be noted that, since the master cylinder is of the portless type, the second piston 17 has no reinforcing member for its portion which confronts with the bottom of the cylinder 11.

Now, the operation of the master cylinder 10 will be briefly described.

When, under the condition shown in FIG. 1, the push rod 13 pushes the first piston 14 to the left in FIG. 1, the latter 14 is moved to the left in FIG. 1 against the elastic force of the first spring 18. As the first piston 14 is moved in this way, the cup-shaped seal ring 20 is moved to the left of the port 35. As a result, the first pressure chamber 15 is isolated from a reservoir (not shown), and the brake fluid in the first pressure chamber, being compressed, is increased in pressure. Next, the sum of the brake fluid pressure of the first pressure chamber 15 and the elastic force of the first spring 18 overcomes the elastic force of the second spring 19, so that the second piston 17 is moved to the left in FIG. 1. As a result, a valve 36 is closed to isolate the second pressure chamber 16 from the reservoir, and the brake fluid in the second pressure chamber 16 is increased in pressure. As the brake fluid in the first and second pressure chambers 15 and 16 is increased in pressure in the above-described manner, the brake fluid pressure is applied to the wheel brakes (not shown); that is, a braking force is generated. When the push rod 13 is released, the first second pistons 14 and 17 are moved to the right and to the left in FIG. 1, respectively. As a result, the first and second pressure chambers 15 and 16 are communicated with the reservoir again, and the brake fluids in those pressure chambers 15 and 16 are therefore decreased in pressure.

Hence, the application of the brake fluid pressure to the wheel brakes is suspended.

A method of manufacturing the piston body will be described with reference to FIG. 2.

Figure 2:
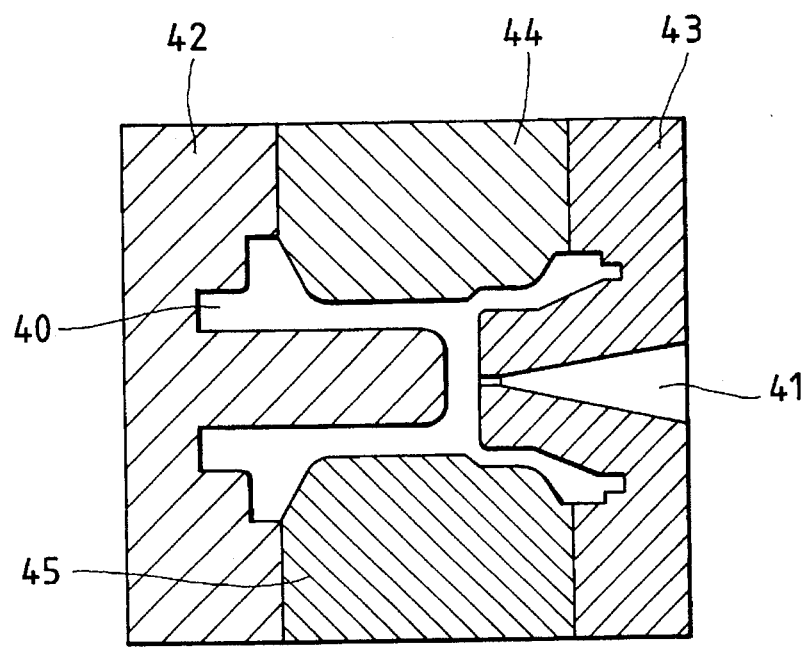
FIG. 2 is a sectional view showing the arrangement of dies in a mold for forming a piston body in the embodiment of the invention.
Figure 3:
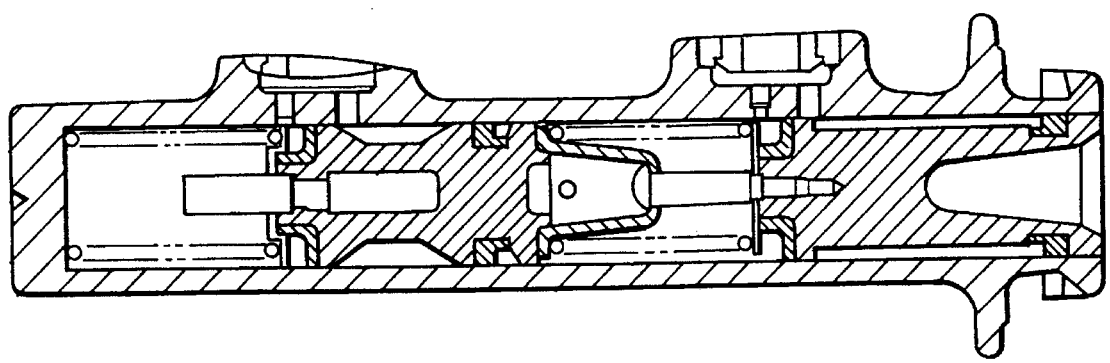
FIG. 3 is a sectional view showing a conventional piston in a master cylinder.

FIG. 2 shows a mold for forming the piston body 28. A cavity 40 of the mold is filled with a molten thermoplastic resin through a gate 41 under a predetermined pressure. Thereafter, the mold is cooled, to coagulate the resin in the cavity 40. While the mold is being cooled, the resin coagulates beginning with its part which is in contact with the mold. Hence, the part of the resin which is in contact with the mold and the part of the resin which is not in contact with the mold are different in the speed of coagulation. That is, the part of the resin which is in contact with the mold is coagulated earlier than the part of the resin which is not in contract with the mold. The difference in the speed of coagulation forms voids in the molding. In the embodiment of the invention, the molding is relatively small in thickness, and therefore voids are scarcely formed therein.

Next, after the resin has coagulated, the mold disjointing operation is carried out. If parting lines are formed on the flanges 24 and 25, then they must be removed. In order to eliminate this troublesome work, in the embodiment of the invention, four molds, namely, a first side mold 43, a second side mold 44, an upper mold 45 and a lower mold 46 which are disjointed from one another, are employed so that no parting line is formed on the flanges 24 and 25.

As is apparent form take above description, in each of the pistons 14 and 17 of the invention, the piston body 28 is made small in wall thickness as a whole. This feature prevents the formation of voids in the molding, and increases the mechanical strength of the piston. In addition, the flat surface 33 of the first reinforcing member 32, and the space 34 around the latter 32 improve the slid characteristic of each of the pistons 14 and 17 which are slidably provided in the cylinder.

The embodiment is the portless type master cylinder; however, the invention is not limited thereto or thereby. That is, the technical concept of the invention may be applied to a master cylinder of the Lockheed type.

As described above, according to the invention, the piston is made up of the piston body, the first reinforcing member, and the second reinforcing member; that is, it is divided into three parts, which decreases the possibility of forming voids in the parts of resin; i.e., in the piston. This feature increases the compressive strength of the piston.

In general, different vehicles have different master cylinders; however, those master cylinders are different from one another only in the stroke of the pressure chamber formed by the piston. Hence, in anyone of the master cylinders, the stroke of the pressure chamber can be changed by changing the first and second reinforcing members with the cylinder and the piston as common components. That is, those common components can be used to manufacture master cylinders for a variety of vehicles.

In forming the piston body with resin, the four molds are employed—two of the molds are so arranged that they are removed along the axis of the piston body from the flanges formed on both ends of the latter, and the remaining two are so arranged as to be removed in a direction perpendicular to the axis of the piston body. That is, in the manufacture of the piston body, no parting lines are formed on the flanges. This eliminates the difficulty accompanying the prior art that the piston cannot be manufactured without the step of removing the parting line, thus contributing to reduction of the manufacturing cost of the piston.

Also, according to the invention, the diameter of the surface of the first reinforcing member through which the first reinforcing member is in contact with the piston body is larger than the diameter of the bottom of the second cylindrical portion. This eliminates the difficulty that load is applied only to the bottom of the piston body; that is, it is collectively applied to the bottom of the piston body.

Further, according to the invention, the first and second reinforcing members define the spaces in the cylinder so that, even if those members are not coaxial with the piston body to an extent, they are prevented from contacting the inner cylindrical surface of the cylinder. This feature maintains the slide characteristic of the piston unchanged.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A piston for a master cylinder, comprising:

a piston body which is made of resin and inserted in said cylinder so that said piston body is in slide contact with an inner cylindrical surface of said cylinder, said piston body including a first cylindrical portion which has a first opening at one end thereof and a bottom at the other end, a second cylindrical portion which has a second opening at one end thereof and a bottom at the other end which is integral with said bottom of said first cylindrical portion so as to be integral with said first cylindrical portion;

flanges formed on both end portions of said piston body so that said flanges are in contact with the inner cylindrical surface of said cylinder;

a first reinforcing member which is detachably inserted into said first opening; and a second reinforcing member which is detachably inserted into said second opening.

2. A piston as claimed in claim 1, wherein the inner diameter of the bottom of said piston body at the side of said first cylindrical portion, which is in contact of said first reinforcing member, is larger than that of the bottom of said piston body at the side of said second cylindrical portion.

3. A piston as claimed in claim 1, wherein each of said first and second reinforcing members defines a space in said cylinder which prevents each of said first and second reinforcing members from contacting the inner cylindrical surface of said cylinder.

4. A piston as claimed in claim 1, wherein said piston body and said second reinforcing member are made of a thermoplastic resin containing reinforcing fibers, and said first reinforcing member is made of metal material.

5. A piston as claimed in claim 1, wherein said cylinder comprises a master cylinder of the portless type.

6. A piston for a master cylinder, comprising:

a piston body which is made of resin and disposed in said cylinder so that said piston body is in sliding contact with an inner cylindrical surface of said cylinder, said piston body including a first cylindrical portion which has a first opening at one end thereof and a bottom at the other end, and a second cylindrical portion which has a second opening at one end thereof and a bottom at the other end which is integral with said bottom of said first cylindrical portion, with said second cylindrical portion being integral with said first cylindrical portion;

flanges formed on both end portions of said piston body so that said flanges are in contact with the inner cylindrical surface of said cylinder;

a first reinforcing member which is detachably inserted into said first opening;

a second reinforcing member which is detachably inserted into said second opening; and a push rod for pushing the piston, said push rod being engaged with the first reinforcing member.

7. A piston as claimed in claim 6, wherein the inner diameter of the bottom of said piston body at the first cylindrical portion, which is in contact with said first reinforcing member, is larger than the inner diameter of the bottom of said piston body at the second cylindrical portion.

8. A piston as claimed in claim. 6, wherein each of said first and second reinforcing members defines a space in said cylinder which prevents each of said first and second reinforcing members from contacting the inner cylindrical surface of said cylinder.

9. A piston as claimed in claim 6, wherein said piston body and said second reinforcing member are made of a thermoplastic resin containing reinforcing fibers, and said first reinforcing member is made of metal material.

10. A piston as claimed in claim 6, wherein said cylinder comprises a master cylinder of the portless type.

11. A piston as claimed in claim 6, wherein the first reinforcing member and the piston body are made of different materials.

* * * * *